(12) United States Patent
Grohens et al.

(10) Patent No.: US 9,353,634 B2
(45) Date of Patent: May 31, 2016

(54) TURBINE BLADE EQUIPPED WITH MEANS OF ADJUSTING ITS COOLING FLUID FLOW RATE

(75) Inventors: Regis Grohens, Tournan en Brie (FR); Renaud Gabriel Constant Royan, Sucy en Brie (FR)

(73) Assignee: SNECMA, Paris (FR)

( * ) Notice: Subject to any disclaimer, the term of this patent is extended or adjusted under 35 U.S.C. 154(b) by 1385 days.

(21) Appl. No.: 13/125,257

(22) PCT Filed: Oct. 16, 2009

(86) PCT No.: PCT/FR2009/051975
§ 371 (c)(1),
(2), (4) Date: Apr. 20, 2011

(87) PCT Pub. No.: WO2010/046584
PCT Pub. Date: Apr. 29, 2010

(65) Prior Publication Data
US 2011/0194944 A1    Aug. 11, 2011

(30) Foreign Application Priority Data

Oct. 22, 2008  (FR) ..................................... 08 57154

(51) Int. Cl.
*F01D 5/08* (2006.01)
*F01D 5/30* (2006.01)
*G05D 23/02* (2006.01)

(52) U.S. Cl.
CPC .............. *F01D 5/3007* (2013.01); *F01D 5/081* (2013.01); *G05D 23/025* (2013.01); *F05D 2250/11* (2013.01); *F05D 2300/50212* (2013.01); *Y02T 50/672* (2013.01); *Y02T 50/676* (2013.01)

(58) Field of Classification Search
CPC .......... F01D 5/187; F01D 5/08; F01D 5/081; F01D 5/3007
USPC ................ 416/90 R, 91, 96 R, 97 R; 415/115
See application file for complete search history.

(56) References Cited

U.S. PATENT DOCUMENTS

| 3,814,313 | A |   | 6/1974  | Beam, Jr. et al. |
| 3,966,354 | A | * | 6/1976  | Patterson ...................... 415/116 |
| 3,975,901 | A | * | 8/1976  | Hallinger et al. ............... 60/786 |
| 4,505,640 | A | * | 3/1985  | Hsing et al. ................. 416/97 R |
| 4,626,169 | A | * | 12/1986 | Hsing et al. ..................... 416/95 |
| 4,730,982 | A |   | 3/1988  | Kervistin |

(Continued)

FOREIGN PATENT DOCUMENTS

| EP | 0 250 323 | 12/1987 |
| EP | 0 266 235 | 5/1988  |
| EP | 1 936 468 | 6/2008  |

OTHER PUBLICATIONS

International Search Report issued Jan. 26, 2010 in PCT/FR09/51975 filed Oct. 16, 2009.

*Primary Examiner* — Sean J Younger
(74) *Attorney, Agent, or Firm* — Oblon, McClelland, Maier & Neustadt, L.L.P

(57) ABSTRACT

A turbine blade cooled by an automatically variable internal flow of cooling fluid. The blade includes orifices situated under the blade root via which the cooling fluid penetrates, and an adjustment plate including holes situated in register with the orifices, the adjustment plate having a coefficient of expansion that is different from the coefficient of expansion of the blade root.

15 Claims, 2 Drawing Sheets

(56) References Cited

U.S. PATENT DOCUMENTS

| | | | |
|---|---|---|---|
| 4,805,398 A * | 2/1989 | Jourdain et al. | 60/806 |
| 4,807,433 A | 2/1989 | Maclin et al. | |
| 4,820,123 A * | 4/1989 | Hall | 416/97 R |
| 5,054,996 A | 10/1991 | Carreno et al. | |
| 5,064,343 A * | 11/1991 | Mills | 415/173.3 |
| 6,059,529 A * | 5/2000 | Schiavo | 416/96 R |
| 6,186,741 B1 * | 2/2001 | Webb et al. | 416/96 R |
| 6,933,459 B2 * | 8/2005 | Helder et al. | 219/117.1 |
| 6,981,845 B2 * | 1/2006 | Balland et al. | 416/96 R |
| 2007/0041836 A1 * | 2/2007 | Tschuor et al. | 416/97 R |
| 2007/0212228 A1 * | 9/2007 | Digard Brou De Cuissart et al. | 416/97 R |
| 2008/0118366 A1 * | 5/2008 | Correia et al. | 416/97 R |

\* cited by examiner

TURBINE BLADE EQUIPPED WITH MEANS OF ADJUSTING ITS COOLING FLUID FLOW RATE

BACKGROUND OF THE INVENTION

1. Field of the Invention

The invention relates to a turbine blade cooled by an internal flow of a cooling fluid such as air. More particularly, the invention relates to an improvement enabling the flow rate of cooling fluid in the blades of a high pressure rotor in an airplane turbojet to be adjusted automatically and passively, i.e. without external control, with the variation in the flow rate of the cooling fluid being a function of the operating speed of the turbojet.

2. Description of the Related Art

In an airplane turbojet, the moving blades of the high pressure turbine are situated immediately after the outlet from the combustion chamber. They are subjected to very high temperatures. It is therefore necessary for them to be cooled continuously. The usual procedure is to establish an internal flow of a cooling fluid, typically air bled from the outlet of the high pressure compressor.

It should be recalled that such a high pressure turbine has a disk fitted with slots in its outer periphery, each slot receiving a blade root. The blade is thus attached to the disk by a shape connection defined between the slot and said blade root.

Each blade has cavities that are fed with cooling fluid. Thus, air taken from the high pressure compressor penetrates through a few holes formed under the blade root, passes through the cavities, and escapes via multiple orifices distributed over the surface of the blade. The cooling air taken from the high pressure compressor is injected into the slots of the disk in order to be able to penetrate into the blades.

Given that this cooling air is bled from the flow through the high pressure compressor and that it does not contribute to combustion in the combustion chamber, it is important to minimize its flow rate in order to increase the performance of the jet and thus decrease its specific fuel consumption.

BRIEF SUMMARY OF THE INVENTION

The invention results from the following analysis. The highest temperatures are reached on takeoff and while climbing. It is thus during those stages that damage to the blades is at its greatest.

It is therefore the practice to take account of the highest temperature that is acceptable on takeoff in order to guarantee a prescribed lifetime for the blade. That temperature determines a certain flow rate of cooling air.

However, the cruising stage is the stage having the longest duration, and while cruising the temperature of the blade is lower by about 100° Celsius.

It would therefore be advantageous to reduce the flow rate of cooling air during this stage, thereby giving rise to an increase in the temperature of the blades, which increase can be accommodated while cruising. Nevertheless, the new cooling air flow rate as calculated in this way would remain practically the same on takeoff and would therefore give rise to a corresponding increase in the temperature of the blades on takeoff, thereby considerably shortening their lifetime. It is estimated that an increase in 20 degrees for this temperature on takeoff and while climbing would reduce lifetime by about half.

The idea on which the invention is based consists in reducing the cooling air flow rate (relative to values determined in application of the rules presently in force), but only while cruising, and to do so by adjusting the flow rate in a manner that is passive, i.e. without external control, being driven entirely by the temperature differences of the blade between its cruising temperature and its temperature at other engine speeds, in particular during takeoff.

More particularly, the invention thus provides a turbine blade cooled by an internal flow of cooling fluid entering via orifices situated beneath a blade root, the blade being characterized in that it includes an adjustment plate provided with holes situated in register with said orifices, in that said adjustment plate is made of a material having a coefficient of expansion different from the coefficient of expansion of the material constituting the blade root, and in that the adjustment plate is mounted under the blade root with longitudinal guidance and is fastened in a manner that conserves the possibility of relative movement between the holes in the adjustment plate and the orifices in the blade root such that the fluid flow section increases with temperature.

The blade in question may be a moving blade of a turbine rotor, in particular a rotor blade of a high pressure turbine in an airplane turbojet.

In an advantageous embodiment, the adjustment plate is made of ceramic, having a coefficient of expansion that is small compared with the coefficient of expansion of the blade root.

In known manner, in its bottom portion, the blade root has a metal calibration plate with the above-mentioned orifices defined therein. Those orifices thus coincide in part with the holes in said adjustment plate. The metal plate may for example be welded under the blade root.

Advantageously, said adjustment plate is fastened at only one of its ends to said blade root, thereby allowing said blade root to expand freely relative to the plate.

In an embodiment, the plate is engaged in a rectilinear guide secured to the blade root so as to prevent the plate from turning relative to the blade root.

In order to take best advantage of the amplitude in the variation of the length of the blade root (i.e. the calibration plate), the orifices situated under the blade root may be triangular in shape.

According to another advantageous characteristic, the holes in the adjustment plate may be square or rectangular in shape.

The invention also provides a turbine including a disk with blades attached to the periphery of the disk, each blade being in accordance with the above definition.

BRIEF DESCRIPTION OF THE SEVERAL VIEWS OF THE DRAWINGS

The invention can be better understood and other advantages thereof appear better in the light of the following description given purely by way of example and made with reference to the accompanying drawings, in which.

DETAILED DESCRIPTION OF THE INVENTION

Figure 1:
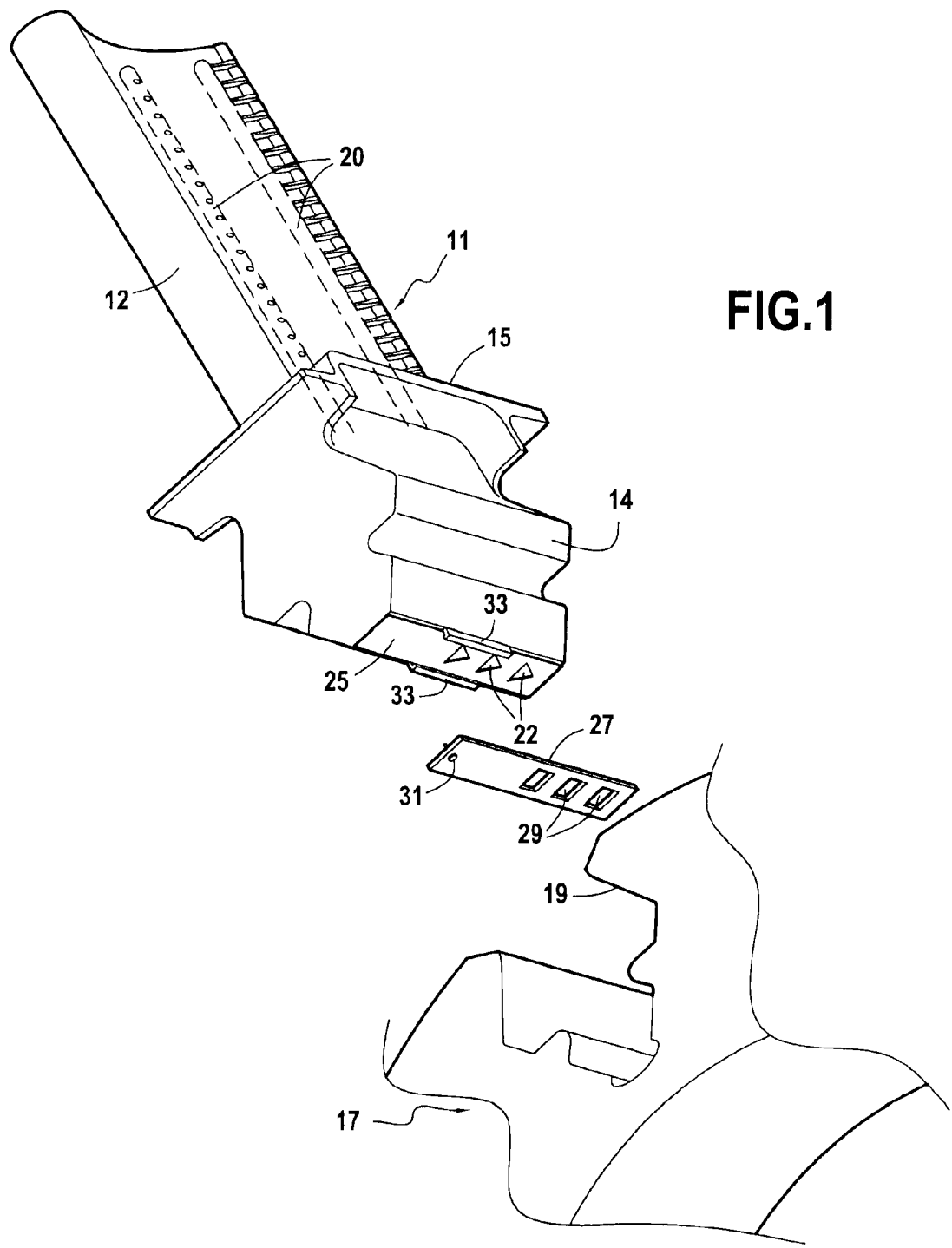
FIG. 1 is an exploded perspective view of a blade in accordance with the invention together with a portion of a rotor disk.

There can be seen a turbine moving blade 11 made up of an airfoil 12 and a blade root 14. The airfoil is separated from the blade root by a platform 15. A turbine wheel is constituted by a disk 17 and a plurality of such blades. At its periphery, the disk 17 has slots 19. Each slot is of a profile corresponding to the profile of a blade root 14 such that each blade is attached to the disk by the defined shape connection between the slot and the blade root. The platforms 15 reconstitute the inside wall of the flow section for the hot gas ejected from the combustion chamber of the turbojet. This arrangement is known and is not described in greater detail. It is also known that it is necessary to cool the blades, since the turbine is driven by the flow of hot gas. For this purpose, each blade is hollow and includes cavities 20 fed via calibrated orifices 22 that are situated under the blade root. An internal flow of cooling fluid is thus maintained within each blade. More precisely, air is bled from a high pressure compressor that normally serves to feed oxidizer to the combustion chamber. This air is channeled to the slots 19 in the disk 17, and it penetrates via the orifices 22 situated under the blade roots and flows along the internal cavities 20 so as to be exhausted via multiple orifices opening out into the surface of the airfoil 12.

In order to calibrate the air flow rate, a metal calibration plate 25 is fastened, generally brazed, to the inside face of the blade root 14. This calibration plate 25 is in the form of a narrow rectangular tongue that has a certain number of holes defining the orifices 22. The coefficients of expansion of the blade root 14 and of the plate 25 are identical, such that they expand together as a function of temperature. In the context of the invention, thermal expansion is used to vary the flow rate of cooling air.

More particularly, an adjustment plate 27 is provided that is made of a material having a coefficient of expansion that is different from the coefficient of expansion of the material constituting the blade root 14 and the calibration plate 25, which adjustment plate includes holes 29 situated in register with the orifices 22 in the calibration plate. The adjustment plate 27 is generally of narrow rectangular shape, comparable to the shape of the calibration plate.

Said adjustment plate 27 is mounted beneath the blade root, here in register with and in contact with the calibration plate 22, being provided with longitudinal guidance (obtained by a rectilinear guide 33), and using a mode of fastening that preserves the possibility for relative movement between the holes 29 in the adjustment plate and the orifices 22 in the blade root (here in the calibration plate), such that the fluid flow section increases with an increases in temperature.

More precisely, the adjustment plate 27 is made of a ceramic or composite material having a coefficient of expansion that is very small compared with the coefficient of expansion of the blade root and of the calibration plate, which are made of metal.

The inlet orifices 22 defined under the blade root coincide with the holes 29 in the adjustment plate 27. The adjustment plate is fastened at only one of its ends to said blade root by means of an anchor element 31. The adjustment plate 27 is held in the rectilinear guide 33 secured to the blade root 14 or to the calibration plate 25. It is pressed against the calibration plate by centrifugal force.

Figure 2:
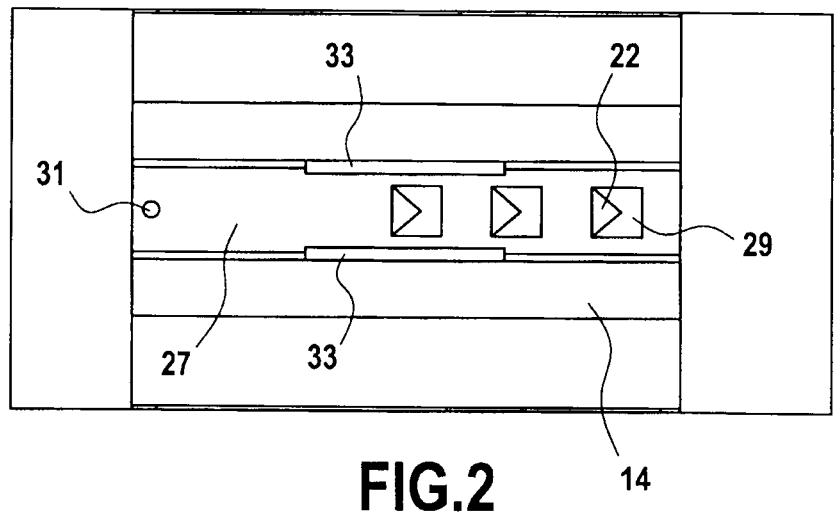
FIG. 2 is a diagrammatic view from beneath of the blade root during takeoff.
Figure 3:
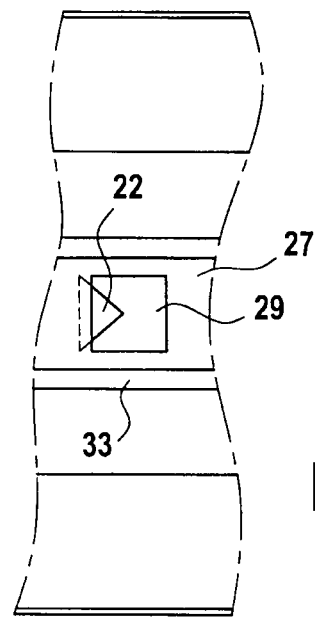
FIG. 3 is a fragmentary diagrammatic view from beneath of the blade root, showing flow rate variation.

In this way, on takeoff, the moving blade 11, which is naturally raised to a higher temperature, is caused to expand overall. At the blade root 14, the coincidence between the orifices 22 in the calibration plate and the holes 29 in the adjustment plate 27 can be seen to vary, since the adjustment plate hardly lengthens at all. As shown in FIG. 2, this relative variation gives rise to a maximum available inlet section for cooling air on takeoff. It suffices to calibrate this section so that the temperature on takeoff reaches a ceiling at a value that guarantees a prescribed lifetime for the blade. In contrast, while cruising, the shrinkage of the blade root that results from a reduction in the temperature of the blade gives rise to a reduction in the cooling air feed section (FIG. 3), and consequently to bleeding less air from the compressor. This increases the overall efficiency of the turbojet while it is cruising. If the flow rate is reduced only while cruising, the lifetime of the blade is shortened, but only by a small amount of the order of 15%. This can easily be compensated by slightly increasing the flow rate during the takeoff-and-climb stage. To sum up, the prescribed lifetime for the blades is preserved while increasing the performance of the turbojet, thereby reducing its specific consumption while cruising.

In order to optimize flow rate variation as a function of differences of expansion between the blade root and the adjustment plate, the holes in the calibration plate are given a triangular shape and the holes in the adjustment plate are given a square or rectangular shape.

In the example, each orifice 22 has an area of 3.5 square millimeters ($mm^2$). Facing each orifice in the calibration plate, there is a square or rectangular hole 29 in the adjustment plate. The edge of the hole coincides with the transverse side of the triangle when the blade root is at a takeoff temperature of 580° C.

After takeoff, the blade root shrinks, thereby partially closing the triangular orifice in the vicinity of its transverse base. When the turbojet is cruising, its temperature is reduced to 450° C. The shrinkage of the blade root as seen by the ceramic plate is 0.025 millimeters (mm). This gives rise to a section reduction of 2.8%. The reduction of flow rate consumed by the moving blade while cruising is proportional to this reduction in area.

The invention claimed is:

1. A turbine blade cooled by an internal flow of cooling fluid entering via orifices situated beneath a blade root, comprising:
   an adjustment plate including holes situated in register with the orifices; and
   a metal calibration plate provided at a bottom portion of the blade root, the metal calibration plate including the orifices defined therein which are in correspondence with the holes in the adjustment plate,
   wherein a fluid flow section is defined by an amount of coincidence between the orifices situated beneath the blade root and the holes included in the adjustment plate,
   wherein the adjustment plate is made of a material having a coefficient of expansion different from a coefficient of expansion of a material constituting the metal calibration plate, and
   wherein the adjustment plate is mounted under the blade root with longitudinal guidance and is fastened in a manner that conserves a possibility of relative movement between the holes in the adjustment plate and the orifices in the blade root such that the fluid flow section increases with temperature due to a difference between the coefficient of expansion of the material of the adjustment plate and the coefficient of the material constituting the metal calibration plate.

2. A turbine blade according to claim 1, wherein the blade is a moving blade.

3. A turbine blade according to claim 1, wherein the adjustment plate is made of a material having a coefficient of expansion that is less than the coefficient of expansion of a material of the blade root.

4. A turbine blade according to claim 1, wherein the adjustment plate is made of a ceramic material, having a coefficient of expansion that is smaller than the coefficient of expansion of the blade root.

5. A turbine blade according to claim 1, wherein the adjustment plate is made of a composite material, having a coefficient of expansion that is smaller than the coefficient of expansion of the blade root.

6. A turbine blade according to claim 1, wherein the adjustment plate is fastened at only one of its ends to the blade root.

7. A turbine blade according to claim 1, wherein the adjustment plate is engaged in a rectilinear guide secured to the blade root.

8. A turbine blade according to claim 1, wherein the orifices situated under the blade root are triangular in shape.

9. A turbine blade according to claim 1, wherein the holes in the adjustment plate are square or rectangular in shape.

10. A turbine comprising:
 a disk; and
 blades;
 the disk including slots in its periphery, each slot receiving a blade root, air being channeled to the slots, wherein each blade is in accordance with claim 1.

11. A turbine blade according to claim 1, wherein the adjustment plate is engaged in a rectilinear guide secured to the calibration plate.

12. A turbine blade according to claim 1, wherein the adjustment plate is planar and a bottom of the blade root which abuts the adjustment plate is planar.

13. A turbine blade according to claim 1, wherein the orifices beneath the blade root are aligned in a lengthwise direction of the blade root, the orifices flowing along internal cavities so as to be exhausted via multiple outlet orifices opening out into a surface of an airfoil of the turbine blade.

14. A turbine blade according to claim 1, wherein the adjustment plate is fastened to the blade root by an anchor element at only one end of the adjustment plate.

15. A turbine according to claim 10, as a high pressure turbine of an airplane turbojet.

* * * * *